L. R. BRANTLEY.
CORN PLANTER.
APPLICATION FILED JULY 19, 1917.
1,274,239.
Patented July 30, 1918.
2 SHEETS—SHEET 2.
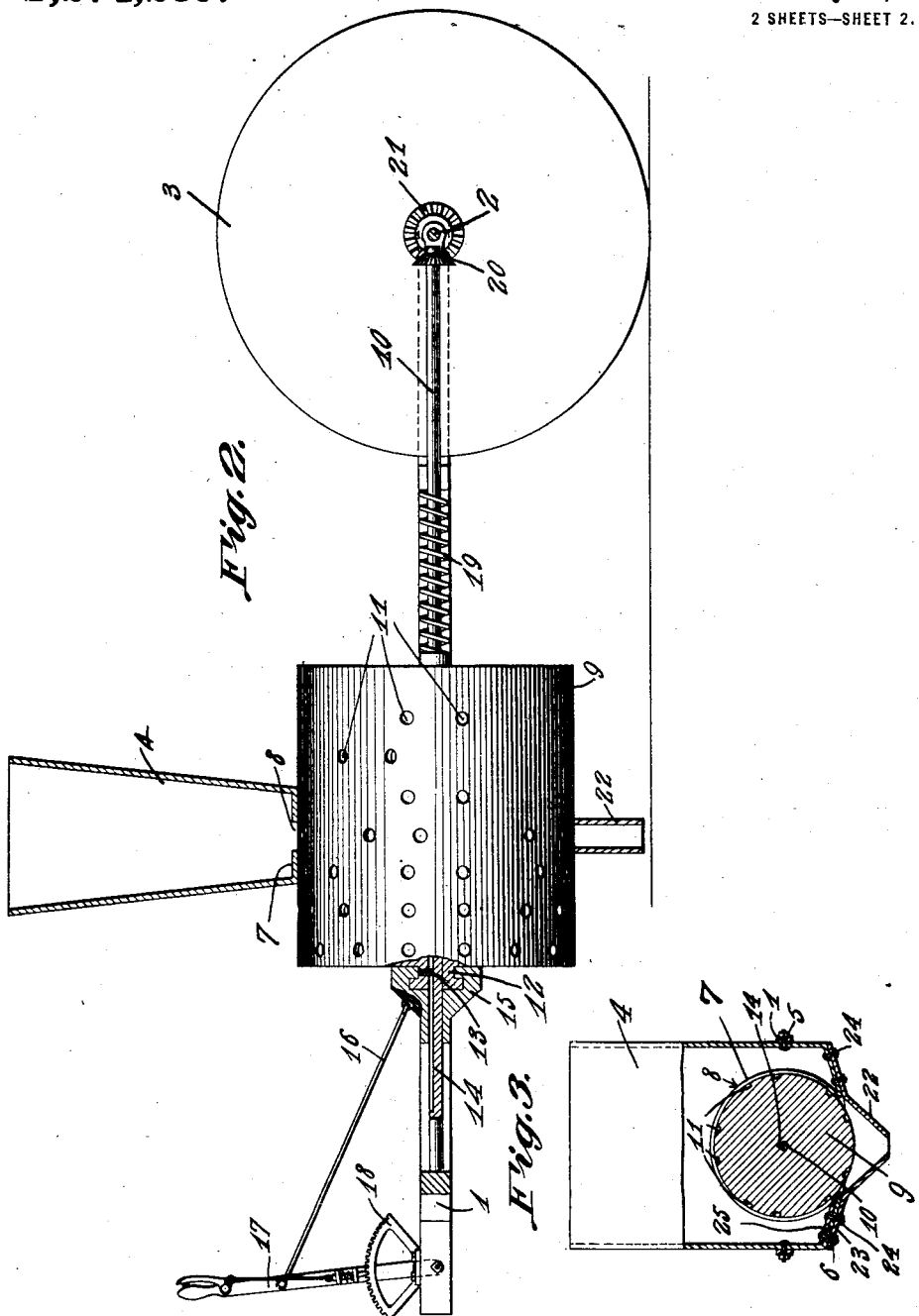
Witnesses
L. R. Brantley, Inventor
by C. A. Snow & Co.
Attorneys

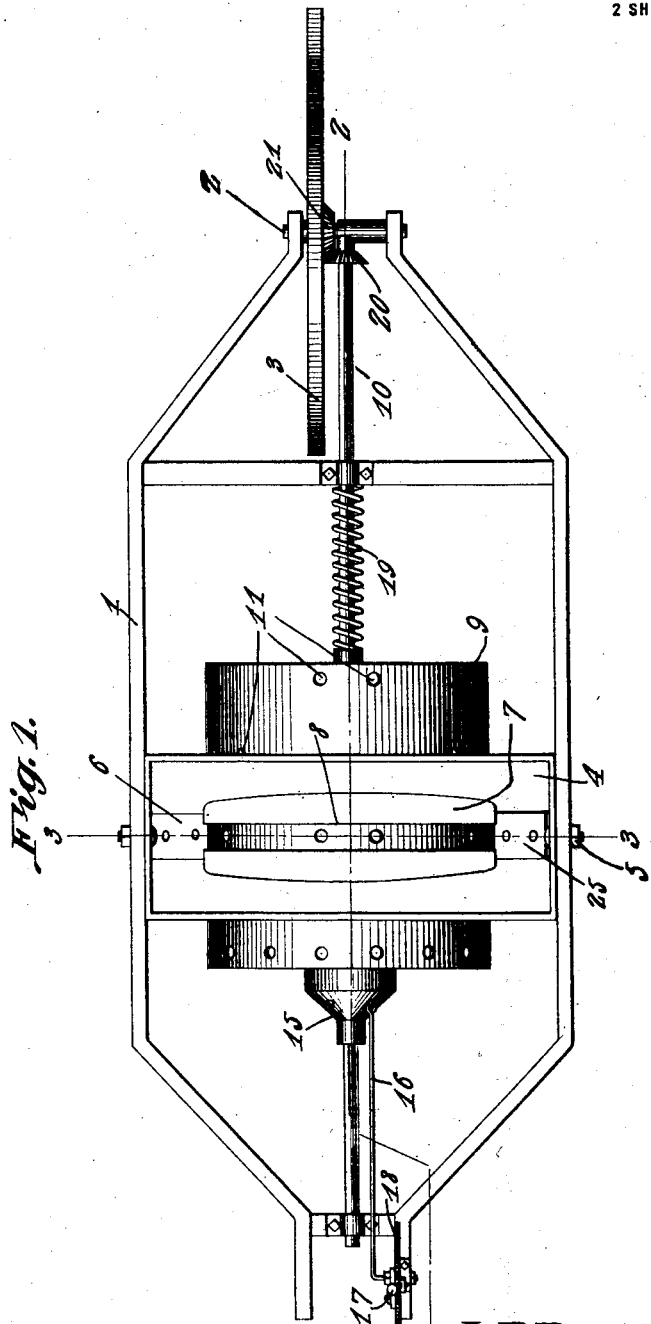

UNITED STATES PATENT OFFICE.

LEWIS R. BRANTLEY, OF MARIETTA, GEORGIA.

CORN-PLANTER.

1,274,239. Specification of Letters Patent. Patented July 30, 1918.

Application filed July 19, 1917. Serial No. 181,593.

*To all whom it may concern:*

Be it known that I, LEWIS R. BRANTLEY, a citizen of the United States, residing at Marietta, in the county of Cobb and State of Georgia, have invented a new and useful Corn-Planter, of which the following is a specification.

This invention relates to seed planters or droppers, and aims to provide a planter having novel and improved means for conveniently and effectively varying the spacing of the dropped corn or other seed.

A further object is the provision of means for discharging the seed from the hopper or receptacle and operable in a simple manner, for changing the intervals at which the seed is dropped, such change being readily made while the machine is in operation, in order that the hills in the row can be spaced to suit the conditions of the ground.

It is also the object of the invention to provide improvements of the nature indicated embodying a simple and inexpensive structure, which will operate efficiently.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein—

Figure 1 is a plan view of the improved planter.

Fig. 2 is a longitudinal section on the line 2—2 of Fig. 1.

Fig. 3 is a cross section on the line 3—3 of Fig. 1.

The planter has a suitable frame 1 embodying side bars or beams, and an axle shaft 2 is journaled within the forward end of the frame and has secured thereon a ground wheel 3.

A seed hopper or receptacle 4 is disposed within the frame between the ends thereof, and its side walls are secured to the side bars of the frame 1 by means of bolts 5 or otherwise. The bottom of the hopper embodies the portions 6 sloping from the lower ends of the side walls, and a curved arched portion 7 united at its ends with the lower adjacent ends of the portions 6 and having its edges united with the front and back walls of the hopper. The portion 7 extends upwardly between the side walls, and extends through an arc of over 180 degrees with its terminals extending below the horizontal plane of the center of curvature of said portion 7. The portion 7 is provided with a longitudinal slot 8 extending from end to end of said portion, enabling the seed to pass from the hopper.

The discharge of the seed is controlled by a drum or cylinder 9 mounted upon and rotatable with the longitudinal shaft 10 journaled in suitable bearings 11 of the frame. The drum 11 is slidable longitudinally upon the shaft, and is provided with longitudinally spaced annular sets of recesses 11 in its periphery, said recesses being preferably arranged in pairs spaced apart circumferentially of the drum. The first set of recesses 11 has but one pair, the next set two pairs, the next set three pairs, and so on, whereby the desired spacing of the seed can be accomplished by adjusting the drum longitudinally to bring the desired set of recesses into registration with the slot 8. The change is readily made by shifting the drum longitudinally within the portion 7 of the hopper within which the drum rotates.

The drum is provided at its rear end with a flanged hub 12 carrying a feather 13 working within a feather way 14 of the shaft 10, whereby the drum is driven by the shaft, although the drum is shifted longitudinally to different positions. A sectional swivel member 15 surrounds the hub 12, to provide a swivel connection therewith, and said member 15 is connected by a link 16 with a hand lever 17 fulcrumed to the frame adjacent to the segment 18 carried thereby, for holding said lever in different positions. By swinging said lever, this will shift the drum 9 longitudinally and hold it in the various positions desired. A coiled wire expansion spring 19 is preferably disposed between the forward end of the drum and one bearing 11, whereby to prevent the drum from vibrating or rattling, and a bevel gear 20 secured to the shaft 10 meshes with a bevel gear 21 secured to the ground wheel 3, whereby the rotation of the ground wheel will rotate said shaft and drum.

A hopper-shaped boot or discharge chute 22 has flanges 23 bearing upwardly against the portion 6 and secured thereto by bolts 24 or otherwise, whereby the seed which drops from the drum will be properly discharged to the ground by the boot or chute 22. A brush 25, which may be held by the bolts 24 at one side, is secured upon one portion 6 and its bristles bear against the periphery of the drum, to prevent the excessive discharge of the seed, said brush brushing the seed back where the recesses 11 move out of the hopper from one end of the portion 7.

In operation, as the planter moves over the ground, the rotation of the ground wheel 3 will rotate the drum at the proper speed, and the seed in dropping into the recesses 11 will be carried therewith past the brush 25 to drop into the boot 22 and thence to the ground. The seed is dropped in pairs spaced a suitable distance apart longitudinally of the row, and by shifting the drum 9 longitudinally, the spacing of the seed is readily changed, even when the machine is in operation.

Having thus described the invention, what is claimed as new is:—

In a planter a frame, a hopper carried thereby, a hopper shaped boot secured to and depending from the bottom of the hopper, said hopper opening thereinto, a shaft extending rearwardly through the hopper, a drum feathered on the shaft and mounted for rotation and for sliding movement in the walls of the hopper, said drum having separate annular series of recesses, a member secured at its ends to the bottom of the hopper and fitting snugly upon and arched over the drum, said member extending from one wall to the other of the hopper and having a longitudinal slot, and means for shifting the drum upon the shaft to bring any one of the series of recesses into register with the slot.

In testimony that I claim the foregoing as my own, I have hereto affixed my signature in the presence of two witnesses.

LEWIS R. BRANTLEY.

Witnesses:
W. L. LINTON,
R. E. HARDAGE.

Copies of this patent may be obtained for five cents each, by addressing the "Commissioner of Patents, Washington, D. C."